United States Patent
Lee et al.

(10) Patent No.: US 9,891,312 B2
(45) Date of Patent: Feb. 13, 2018

(54) PERSONAL RADAR

(71) Applicant: Greina Technologies, Inc., Salt Lake City, UT (US)

(72) Inventors: Daniel Joseph Lee, Salt Lake City, UT (US); Thomas Schmid, Salt Lake City, UT (US)

(73) Assignee: Greina Technologies, Inc., Salt Lake City, UT (US)

( * ) Notice: Subject to any disclaimer, the term of this patent is extended or adjusted under 35 U.S.C. 154(b) by 307 days.

(21) Appl. No.: 14/265,081

(22) Filed: Apr. 29, 2014

(65) Prior Publication Data

US 2014/0320335 A1    Oct. 30, 2014

Related U.S. Application Data

(60) Provisional application No. 61/817,737, filed on Apr. 29, 2013.

(51) Int. Cl.
*G01S 13/87* (2006.01)
*G01S 13/58* (2006.01)
*G01S 13/00* (2006.01)

(52) U.S. Cl.
CPC .......... *G01S 13/878* (2013.01); *G01S 13/588* (2013.01); *G01S 13/003* (2013.01)

(58) Field of Classification Search
CPC .............................. G01S 13/588; G01S 13/878
USPC .................................. 342/107, 109, 112, 118
See application file for complete search history.

(56) References Cited

U.S. PATENT DOCUMENTS

| | | | |
|---|---|---|---|
| 4,170,773 A | 10/1979 | Fitzsimmons et al. | |
| 8,854,258 B2 * | 10/2014 | Krozer | G01S 13/003 342/192 |
| 2003/0043929 A1 * | 3/2003 | Sampath | H04B 7/0417 375/267 |
| 2007/0013578 A1 | 1/2007 | Iritani et al. | |
| 2008/0077015 A1 | 3/2008 | Boric-Lubecke et al. | |
| 2008/0111733 A1 | 5/2008 | Spyropulos | |
| 2009/0303126 A1 * | 12/2009 | Jain | G01S 13/003 342/368 |
| 2010/0277360 A1 | 11/2010 | Lee | |
| 2010/0289690 A1 | 11/2010 | Dai | |
| 2012/0280862 A1 | 11/2012 | Moffatt et al. | |

OTHER PUBLICATIONS

International search report and Written Opinion for PCT/US2014/035934, mailed on Mar. 13, 2015.
Extended European Search Report for EP Application No. 14829967.0, dated May 2, 2017.

* cited by examiner

*Primary Examiner* — Timothy A Brainard
(74) *Attorney, Agent, or Firm* — Workman Nydegger

(57) ABSTRACT

Systems and methods for providing personal radar, object presence detection, and object localization are provided. Multiple devices that perform high-resolution ranging can be operated to perform radar in an area, detect objects and motion of objects in the area, and generate a virtual steerable antenna.

5 Claims, 6 Drawing Sheets

PERSONAL RADAR

CROSS-REFERENCE TO RELATED APPLICATIONS

This application claims the benefit of U.S. Provisional Application Ser. No. 61/817,137, filed Apr. 29, 2013 and entitled PERSONAL RADAR, which application is incorporated by reference in its entirety.

BACKGROUND OF THE INVENTION

1. The Field of the Invention

Embodiments of the invention relate to systems and methods for detecting objects and/or the motion of objects. More particularly, embodiments of the invention relate to personal radar, object presence detection, and object localization.

2. The Relevant Technology

There are many methods on how one can detect objects and/or the motion of an object. Most devices use time of flight from echo, chirp, frequency modulation (FM), or Doppler radar for the detection or to detect the motion of objects. Many use steerable antennas or phase array antennas to detect those objects. Yet others use simple measurements of the received signal strength (RSS) to detect movements within an area. These types of systems are often costly, power hungry, expensive, and/or inaccurate or not sufficiently accurate.

BRIEF DESCRIPTION OF THE DRAWINGS

In order to describe the manner in which at least some of the advantages and features of the invention can be obtained, a more particular description of embodiments of the invention briefly described above will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF THE PREFERRED EMBODIMENTS

Figure 1:
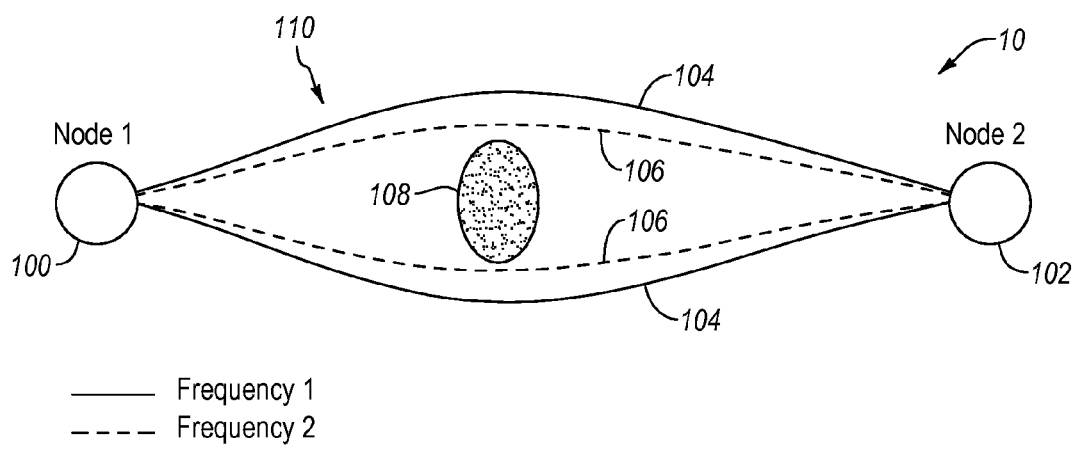
FIG. 1 illustrates an example of a ranging system that includes two radios that each include a single antenna.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments of the invention relate to systems and methods for detecting and/or measuring and/or tracking objects, the motion of objects or the movement of objects in an area. Embodiments use a novel approach to detect objects or the motion of objects using devices that perform high-accuracy ranging methods. These methods use, in one example, one or more of an angle of arrival, a time difference, and/or a phase difference for detecting changes in the wave-propagation. The position of objects and the movement of the objects can be determined from the changes in the wave-propagation. Advantageously, the position and movement of objects that interfere with the wave-propagation can also be determined.

It is often difficult to detect an object in a crowded area or location like a jungle or landscape, with no direct line of sight. In accordance with embodiments of the invention, as long as two devices (e.g., radios) can communicate and measure the effective path distance between them, an object that comes into the path of the two radios can be detected by measuring an increase in the distance the radio signal has to travel to go around the new object in the path. In other words, changes in the effective path distance are indicative of an object that has entered the path between the two radios.

Conventional methods use signal strength or a link quality indicator, but these methods are unreliable because the signal strength can get stronger by refraction, or weaker depending on the path or position of the object. In addition, conventional devices use time of flight from echo, chirp, frequency modulation (FM), or doppler radar for the detection or to detect the motion of objects. Some conventional devices use steerable antennas or phase array antennas to detect objects. Conventional devices combine the signals in the antenna feed electronics to record multiple radio paths at the same time, or use multiple radios.

Embodiments of the invention can detect objects and/or the motion of objects using a device (e.g., a device capable of transmitting and/or receiving a signal such as an electromagnetic signal such as a radio) or a pair of devices and a low cost switch to select a single antenna at a time, out of an array of many antennas. Embodiments include a stable system clock and the phase between the antennas can be measured at different times, which differs from conventional units that use multiple radio paths or multiple radios. Advantageously, embodiments of the invention can be implemented at significantly lower cost.

The embodiments of this invention use a novel approach to detect objects or the motion of objects using high-accuracy ranging methods as described, by way of example, in U.S. Pat. No. 8,274,426, which is incorporated by reference in its entirety. In one embodiment, ranging methods may be employed to find angle of arrival, time difference, and/or phase difference of narrowband signals for detecting changes in the wave-propagation. The position and movement of objects interfering with that propagation can be determined. Employing high-resolution propagation-path length measurements can overcome conventional problems, and significantly improve accuracy.

One embodiment uses a single radio and a low cost switch to select a single antenna at a time, out of an array of many. This is possible because the system includes tightly synchronized clocks that are within a few Hz of each other. Because the system clock is stable, the phase between antennas can be measured at different times to get the same information as conventional units, but at a lower cost. The stability also allows an extremely high resolution at the millimeter level.

The following discussion illustrate embodiments of the invention that are representative of embodiments in different platform configurations. The systems may exhibit different characteristics with respect to detection capabilities, cost, and complexity. In contrast to conventional systems, embodiments provide high-resolution path length measurements that allow new ways of detecting interference with the electromagnetic wave propagation.

FIG. 1 illustrates an example of a ranging system that includes two radios. The ranging system 10 can be used not only for ranging applications but also as a radar system that can detect the presence of objects and well as the motion of objects. Each radio includes a single antenna, although embodiments may contemplate other additional antennas in each radio in the ranging system 10. FIG. 1 further illustrates the effective path of the signals between the radios may be different at different frequencies. Although FIG. 1 illustrates two radios, embodiments of the invention can be configured to include multiple radios. For example, different pairs of radios in a ranging system that includes multiple radios could each use specific frequencies. In addition, one radio may communicate with different radios using different frequencies.

FIG. 1 illustrates a system that includes a radio 100 and a radio 102 that communicate over an effective path 110 (e.g., line of sight in one example). The radios 100 and 102 can perform high-precision ranging as described in U.S. Pat. No. 8,274,426, which is incorporated by reference in its entirety, and have phase measurement capabilities. One of the radios, e.g., the radio 102, includes a high-precision, high-stability controllable oscillator. In this example, the radio 100 is a master and the radio 100 transmits a narrow-band radio signal at a higher frequency than a frequency of the local oscillator. This is achieved, in one example, using a phase-locked loop (PLL) and voltage controlled oscillator (VCO) that are included in the radio 100 (the radio 102 may be similarly configured). This higher frequency signal is sent to the second node or radio 102. The radio 102 tunes to the higher frequency signal using its PLL and VCO. The radio 102 may also adjust its controllable high-stability local oscillator to the incoming signal. In this manner, an ultra-high synchronized system is achieved.

The higher frequency helps in adjusting the local oscillator with a higher precision. Advantageously, a lower-resolution phase measurement at the higher frequency can be employed, and can be related to the lower frequency clock crystal due to the use of PLLs.

For example, assume a low-frequency of 16 MHz, and a high-frequency of 2.4 GHz. This gives a multiplier of 150. If the second unit (e.g., the radio 102) uses the 2.4 GHz signal to tune its local 16 MHz signal to achieve phase coherency with the 16 MHz signal of node 1 or the radio 100, then a low-resolution phase measurement unit at the 2.4 GHz signal is enough to achieve extremely high synchronization stability. For example, assume that a 10 degree phase error at the 2.4 GHz signal is corrected every 15 ms. This corresponds to an absolute synchronization stability of $\frac{1}{15}$ degree correction every 15 ms, or 4.4 degrees error per second (0.012222 Hz). This equals a synchronization stability of 764 parts-per-trillion.

The second radio 102 sends a narrow-band signal back to the first node or the radio 100. Due to the highly synchronized oscillators, this second radio 102 acts like an almost perfect active reflector, and it looks as if the incoming radio wave was simply reflected back to the radio 100. The first node or radio 100 can then measure the difference between its local high-frequency signal, and the incoming high-frequency signal. The difference in phase will correspond to the path length.

If an object (e.g., the object 108) travels through the path 110, the path 110 changes. In other words, the length of the path 110 changes in distance because the radio waves or the transmissions between the radio 100 and the radio 102 travel around the object 108. Because the radios 100 and 102 are configured to detect an accurate range or distance, the change in the distance can be detected. A change in the distance can be interpreted as the presence of a new object— the object 108.

In addition, a size and/or speed of the object 108 can be measured by looking at the peak-change in distance, and at the time required to achieve the peak change. The peak will reflect the size of the interfering object, while the time to peak correlates with the speed of the object.

Furthermore, using two or more frequencies, the size of the object 108 can be deduced quickly due to the different propagation properties at different frequencies. For example, a 900 MHz signal will travel differently around the intruding object 108, compared to a 2.4 GHz signal. This difference in path can be measured due to the high-stability local oscillators and almost perfect active reflector, and thus the size of the object 108 can be determined. The radio 100 can thus emit a signal 104 at a first frequency and a second signal 106 at a second signal. The radio 102 can effectively reflect these frequencies as previously described. The size of the object 108 and the speed of the object can then be determined.

As described above, the presence of an object can be determined when a change in the distance of the transmission path 110 is detected. The size and/or speed can also be detected.

Figure 2:
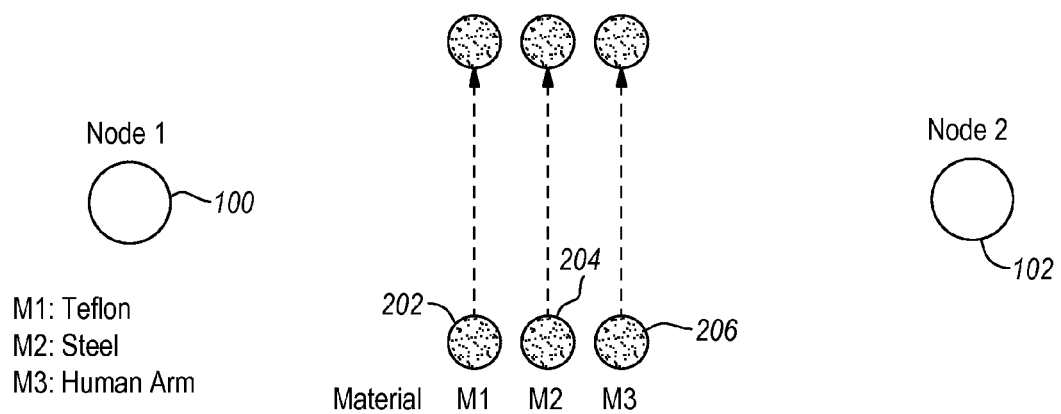
FIG. 2 illustrates an example of detecting different types of objects with the ranging system.

FIG. 2 illustrates an example of detecting different types of objects with the ranging system 10, which can effectively operate as a radar system. The radar system can be configured for a specific area and the radios can be arranged in the area (e.g., on the perimeter or inside of the area) in a manner than enables objects and their motion to be identified and tracked. FIG. 2 illustrates different objects including a Teflon object 202, a steel object 204, and a human arm object 206. Each of the objects 202, 204, and 206 was moved into the path of the nodes or radios 100 and 102.

Figure 3:
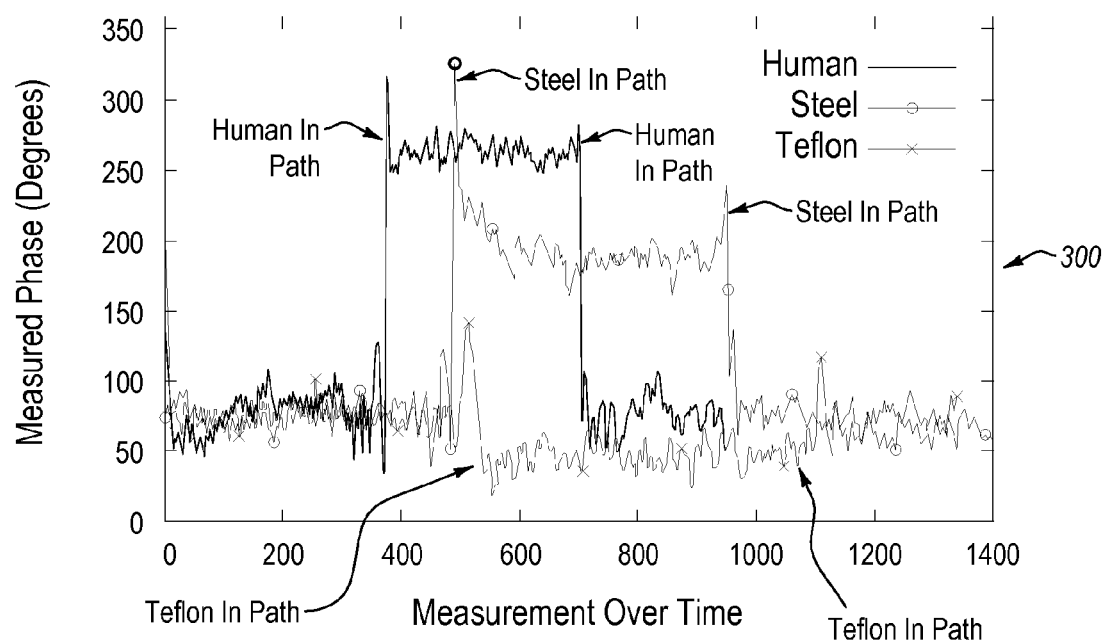
FIG. 3 illustrates measurement results for three different objects of different materials crossing the path of two distance-ranging nodes or radios.

The measured phase, and path distance, change are shown on FIG. 3. FIG. 3 illustrates measurement results 300 for three different materials (or objects of different material) crossing the path of two distance-ranging nodes such as the radio 100 and the radio 102. The materials resided within the path for a while, before they were removed again. The different path changes for the different objects are illustrates and correspond to the different material properties which include size.

One embodiment of this two-radio system can be used for perimeter control, allowing to protect a certain area by placing a multitude of these two-radio systems around the area, where each link defines the perimeter of the area to be protected. If a foreign object passes through any one of the paths set up by the multitude of two-radio systems, an alarm can be raised, identifying where the path has been broken, and how big the object is. The ability of the radios to use different frequencies may also enhance the ability to control a perimeter. Each link, which may include a pair of radios and each radio may belong to more than one pair of radios, may use the same or different frequencies.

Figure 4A:
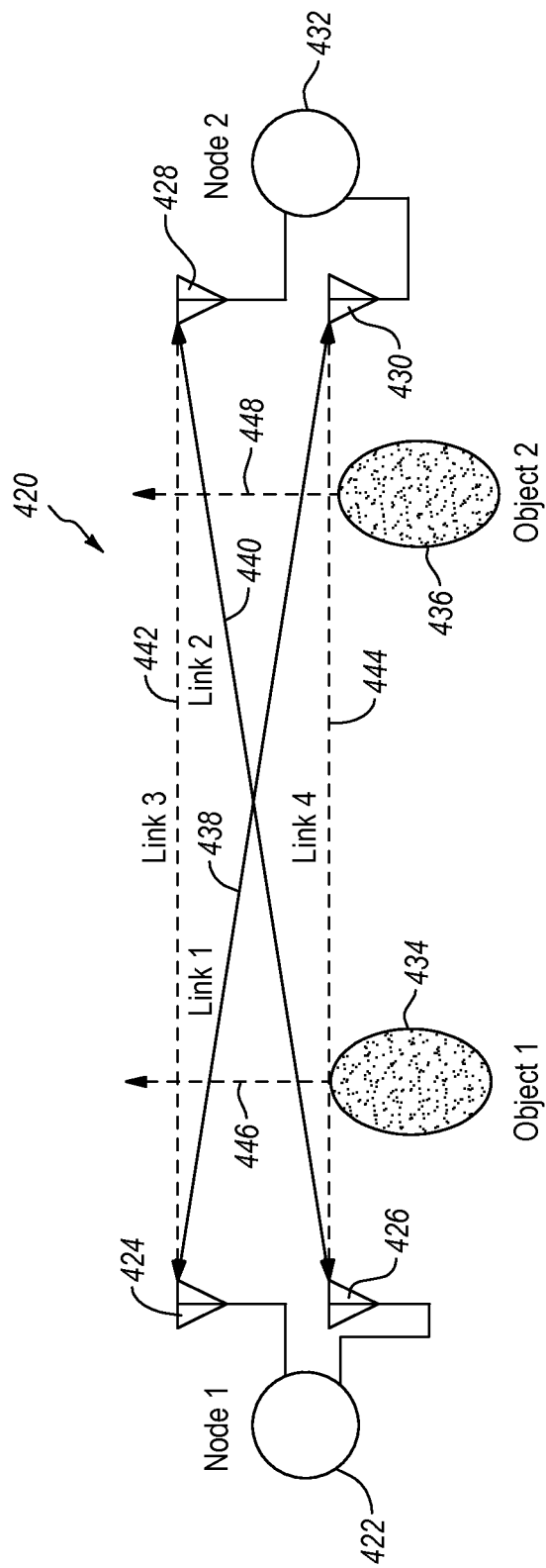
FIG. 4A illustrates an example of a ranging system that includes two radios. Both radios includes an RF switch with two antennas.

FIG. 4A illustrates an example of a multi-antenna system for the detection of presence or absence of an object and a location at which the object crosses an electromagnetic wave path. FIG. 4A illustrates an electromagnetic wave path 420 that may be established between two radios (node 422 and node 432). The node 422 may include two or more antennas (illustrated as antennas 424 and 426). The node 432 may include two or more antennas (illustrated as antennas 428 and 430). The antennas may be separated in space by any distance, where the distance will determine the angle resolution and detection angle width. In one example, the distance is the frequency wavelength divided by 2 (lambda/2), as this provides a 180 degree detection angle. In another example, the distance may be related to the size of the objects that are being detected. For example, the distance may be half the size of the object to be detected.

The nodes 422 and 432 may engage in high-resolution ranging as previously described and may switch between antennas. As a result, it is possible to establish and measure or monitor several RF paths or several electromagnetic paths. The electromagnetic wave path 420 can include a paths 438, 440, 442, and 444. The path 438 is established between the antenna 424 and the antenna 430. The path 440 is established between the antennas 426 and 428. The path 442 is between the antennas 424 and 428. The path 444 is between the antennas 426 and 430.

By establishing multiple paths, the ability to track an object or to track motion of the object is further enhanced. For example, if the object 434 or the object 436 crosses between the two nodes, the various paths 420 between the nodes 422 and 432 will have different changes in distance over time. For example, if the objects 434 and 436 move into the path 420 from below, they will impact the various paths in different ways. For example, the object 434 is detected via the path 440 before the path 438 while the object 436 is detected by the path 438 before the path 440. Because the arrangements of the nodes in any given system can be known, it is possible to infer where an object crosses the path 420 between the nodes 422 and 432.

For example, the presence of the object 436 may be detected when changes in the path 444 are detected. When changes to the path 438 are detected next instead of to the path 440, the location of the object 436 relative to the nodes 422 and 432 can be inferred. The location of the objects can be inferred even when the antennas are spaced relatively close due to the nature of electromagnetic waves.

The implications of this one-dimensional localization can be used, for example, in a perimeter alarm system, where it is useful to know not just that an object crossed a line or perimeter, but where the perimeter has been crossed. This is especially important if the distance between the nodes is large.

An extension to the two node scenario illustrated in FIG. 4A is a 2+ node scenario, where the nodes all engage in a high-resolution ranging to each other. Now, the crossing distance can localize an object within the observed area not just by looking at the change in signal strength and attenuation, but by the change in RF path length.

Figure 4B:
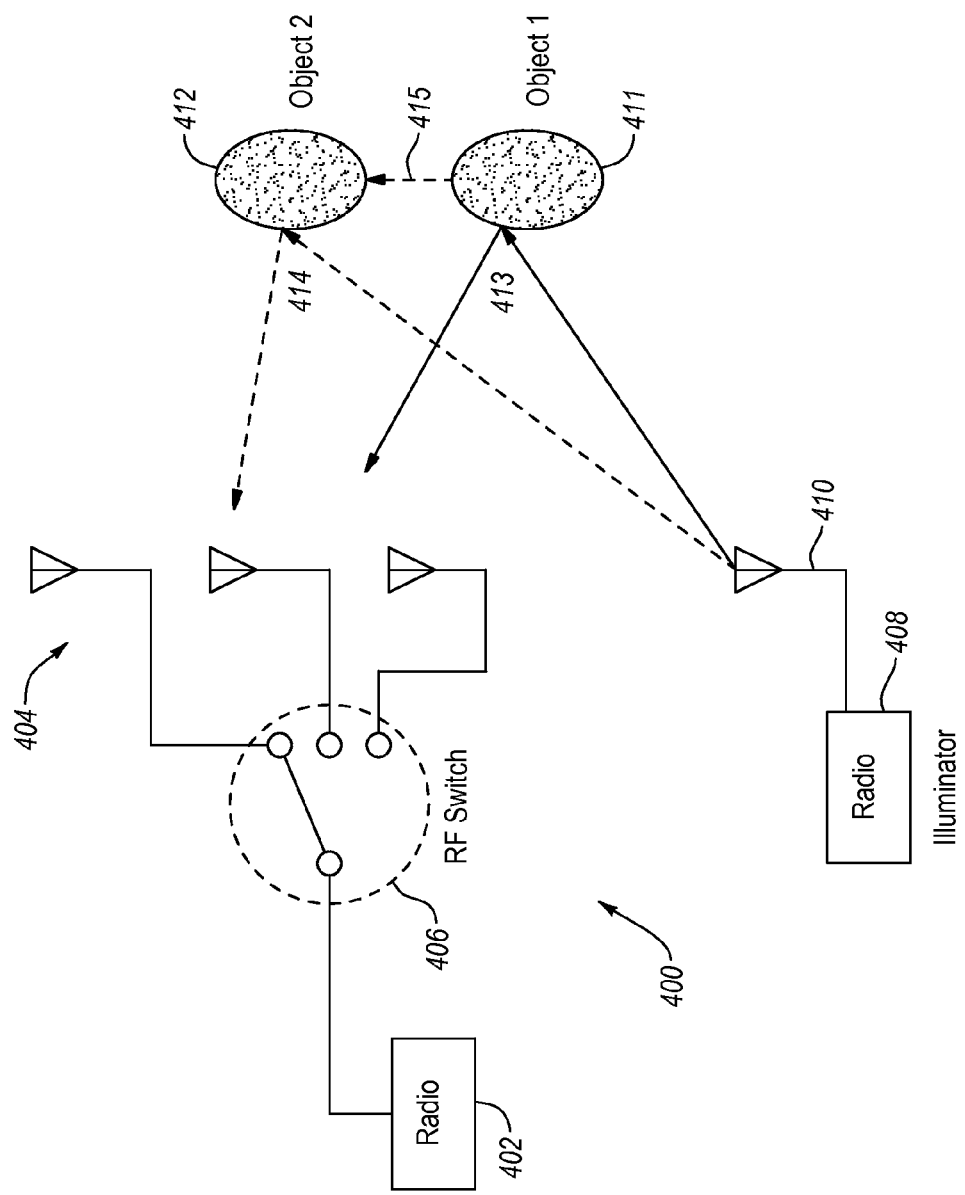
FIG. 4B illustrates an example of a ranging system that includes two radios where one radio includes an RF switch with multiple antennas and a second radio includes one antenna.

In another example, the ranging system may include a single radio with multiple antennas and a single illuminator. A basestation may include one receiver radio (or transceiver) with phase measurement capabilities and multiple antennas. FIG. 4B, for example, illustrates a basestation 402 containing one receiver radio (or transceiver) 402 and multiple antennas 404. The antennas 404 are connected to the one radio 402 using a network of antenna switches 406. In this example, the radio 402 can be connected to one of the antennas 404 at a time in one embodiment, although the switch 406 may be configured to connect more than one antenna to the radio at a time. A second unit, called an illuminator 408, includes a transmitter radio (or transceiver) and needs only one antenna 410. The second unit or illuminator 408 sends out a narrowband signal, illuminating the environment 400.

Due to the high-stability of the local clocks as described previously, the basestation 402 can switch between the different antennas 404, and measure the differences between the different received signals. Using a microcontroller unit (e.g., a processing device), the basestation 402 can recombine these signals and create a virtual steerable antenna. This steerable antenna can be used to "map" the different paths 413, 414 the signals take from the illuminator 408 to the basestation 402, essentially producing a signal-strength versus angle map. An object, like an object 411 or an object 412 reflects the signal from the illuminator 408 back to the basestation 402. The virtual steerable antenna will then give a higher signal strength in the direction of object 411, and another one in the direction of object 412. This increase in signal strength in those directions indicates an object, and thus the angle to the object can be determined. In addition to detecting an object, the speed and/or direction of movement can also be determined and tracked. In one example, the history of the object can also be stored in a memory.

The distances of the object(s) can be found by measuring the path length of the paths 413 and 414. The path length can be determined by using the steerable antenna, and employing a high-precision RF ranging measurement. Knowing the location of the illuminator 408, the basestation 402, and the angle to the object being detected, the object can be triangulated by finding the location given the path length. The location is not necessarily unique, as there might exist mirror solutions. Adding multiple basestations, or restricting the detection area can resolve these secondary locations, resulting in a unique object location.

This system can further track objects by measuring object locations over time. Assume a scene where only object 411 is present, and that the basestation 402 located that object with the aforementioned method. After a certain time, object 411 moves to object 412's location. The basestation 402 will now discover that object 411 is not at its old location anymore, as the signal strength disappeared from that previous angle, but instead there is now a stronger signal from the angle of path 414. Thus, the object 411 has been tracked to have moved from location 411 to location 412. In one example, the identity of the object can be determined, for example by measuring its size.

A ranging or radar system as illustrated in FIGS. 4A and/or 4B can also be used to find distance (using phase, similar to the examples previously described) and direction (angle). In one example, two or more basestations 402 can be used. In this case, using direction (angle) measurements can also use two or more basestations and using direction (angle) measurements, the location of a transmitting node can be triangulated.

In addition, the radios can hop to different frequencies to exploit the differences in propagation characteristics. The radio 408 can hop to different frequencies, exploiting the difference in propagation characteristics.

Conventional radar systems employ RF chirps or regular FM radar in order to detect passive RF reflecting objects. Embodiments may use a frequency-hopping high-resolution ranging system by observing the change in phase over multiple frequencies to achieve similar results. This provides a radar system using a high frequency-hopping high resolution ranging system.

Detecting passive RF reflecting components includes the detection of multi-path components in a ranging system. If the objective is to measure the distance between two systems, then multi-path is undesirable, as it will impact the accurate measurement of the distance. But multi-path comes from RF reflecting objects that are at different locations, and thus introduce new path lengths. If the location of the transmitter and receivers are known (for example either through a site survey, or by using an RF localization system), then the change in multi-path indicates the movement of RF reflecting objects, and thus, the system becomes an active personal radar system.

The personal radar system may include two or more transmit and receive pairs that are engaged in high-resolution ranging. The transmitter and receiver use one (or more) narrow-band carrier frequency to synchronize their clocks, and then hop over one or more secondary non-continuous frequency carriers in one example. The different frequency carriers have a different wavelength from each other, and thus the receiver will measure a change in phase over the different frequencies. In addition, multi-path will impact the different frequencies differently. The receiving node can now go from the phase domain to a time domain plot by applying a Fast Fourier Transform (FFT) on the measured phases. The different multi-path components will now show up as different peaks in the result of the FFT. By keeping track of the different multi-path lengths, a system with only one transmitter and one receiver can map the change in the environment, and detect if new objects enter or leave the environment.

Combining the results of several transmit/receive pairs, and knowing the location of those pairs allows to trilaterate the actual reflector location. When more node pairs are present, the trilateration works better.

Figure 5:
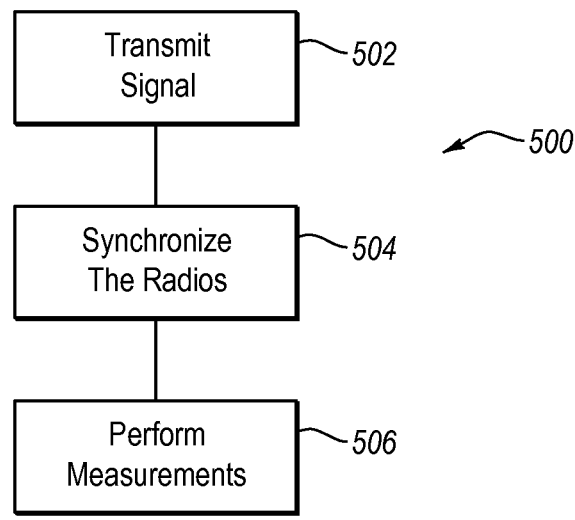
FIG. 5 illustrates a block diagram of the method for performing measurements.

FIG. 5 illustrates a method for performing ranging methods. Examples of ranging methods include, but are not limited to, determining a distance to an object, tracking motion of the object, determining a size of the object, identifying a location of a transmitter in a system, setting up a perimeter, performing radar in an area, or the like or any combination thereof.

The systems and methods discussed herein can use radio signals and the propagation paths between these radios. By synchronizing one radio with another radio, high accuracy ranging is achieved and changes in the detected path distance can indicate the presence of an object.

The method 500 begins by transmitting a signal in box 502. The signal is typically transmitted from one radio to another radio (the radios may be similarly configured). The signal enables the two radios to become highly synchronized and the radios synchronize in the box 504. This can be an ongoing process the continually synchronizes the signal transmitted from one radio and effectively reflected by another radio.

In box 506, measurements are performed. This can include determining a distance to the object, determining the presence of the object, determining the size and/or speed and/or direction of the object. As additional radios are added to the system or as antennas are added to a single radio, the capabilities of the system expand. As discussed previously, a virtual steerable antenna can be used to determine a direction of a detected object.

The ranging system 10 can be connected to a server computer over a network. The data collected by the ranging system 10 can then simply be transmitted for remote analysis.

Figure 6:
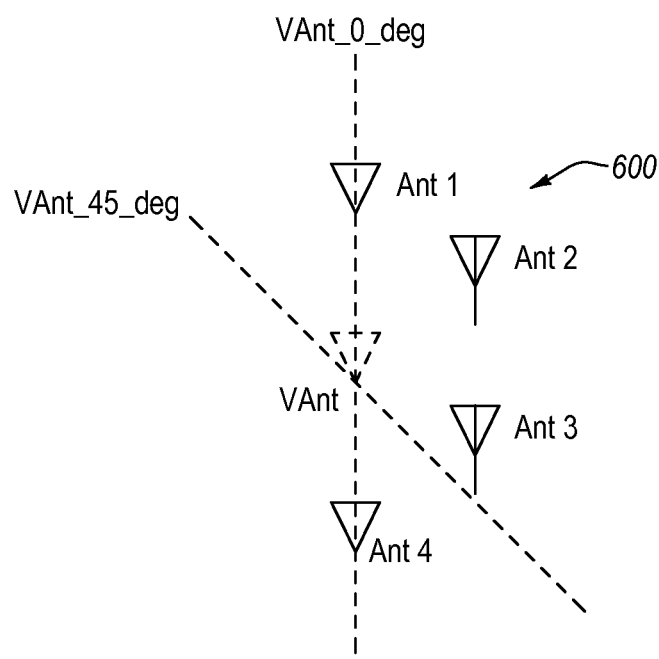
FIG. 6 illustrates an example antenna constellation for a virtual steerable antenna.

FIG. 6 illustrates an example of a multi-antenna setup for the calculation of a virtual steerable antenna. Multiple antennas can extend the capabilities of a personal radar system or of the examples disclosed herein. Combining the phase measured at each antenna allows to create a virtual steerable antenna that one can point into different directions.

An example of such an antenna array is depicted in FIG. 6 In this configuration, antennas at locations Ant 1: 0/5.9, Ant 2: 5.2/3.0, Ant 3: 5.2/−3.0, Ant 4: 0/−5.9. Knowing the antenna location, a virtual antenna direction can be decided or determined. For example, the virtual antenna could be concentrated at the center 0/0 to the right (0 degrees). Given the wavelength frequency of the signal expected, the expected phase shift is for the different antennas can be calculated. In FIG. 6, assuming a frequency of 2.5 GHz, a phase shift at Ant1 of 0, Ant2 of 2.7, Ant3 of 2.7, and Ant4 of 0 radians.

Figure 7:
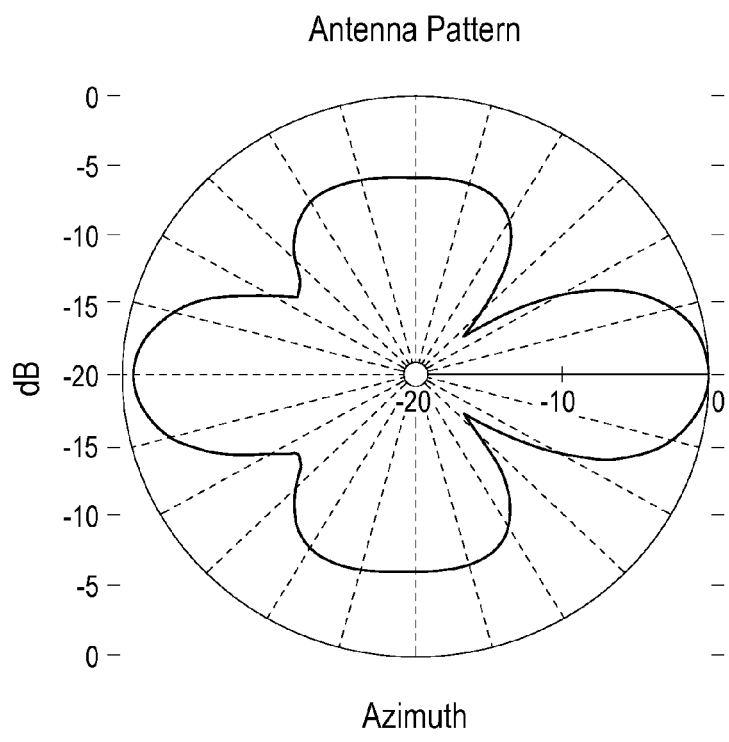
FIG. 7 illustrates the resulting virtual antenna pattern if the virtual antennal is pointed towards zero degrees.

Knowing these values, these values can be subtracted from the phases measured during a high-resolution ranging operation. This effectively concentrates the antenna into the 0 degree direction. FIG. 7 depicts the resulting virtual antenna pattern.

Figure 8:
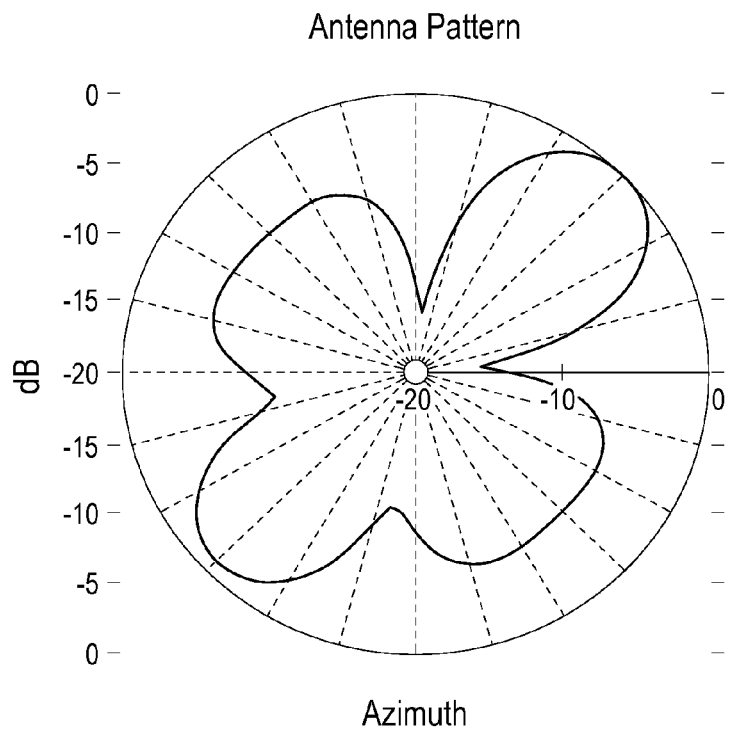
FIG. 8 illustrates the resulting virtual antenna pattern if the virtual antenna is pointed towards 45 degrees.

The advantage of a virtual antenna to a physically tuned phased array is that it is possible to look into all directions at the same time. For example, to "look" at a signal from the 45 degrees direction (see FIG. 6), the phase shift can be calculated as Ant1: 2.2, Ant2: 3.0, Ant3: 0.8, and Ant4: −2.2 rad. Again, assuming this signal direction, and looking at the virtual antenna pattern results in the pattern shown on FIG. 8.

Using the virtual antenna on one carrier frequency will provide peak power and angle information of the different multi-path components. However, using high resolution ranging, and hopping over multiple frequencies now allows for calculating the aforementioned FFT pointing into every single virtual antenna direction. This gives the additional information of multi-path distance.

A high-resolution ranging system with an RF switch to multiple antennas improves on conventional systems as angle, power, and distance for each multi-path component can be determined.

The innovation can now be combined with a multitude of different receive and transmit combinations with different antenna patterns (line, circle, cross, 2 dimensional arrays, 3 dimensional cubes, etc). The antenna array can also be only on the transmitter, with a single antenna receiver, or on the receiver, with single antenna transmitter. Coordination can take care of the antenna switching, such that both ends can calculate the angle, distance, and power information of the multi-path components. Combining the information of multiple of these instantiations will allow for a robust radar system where RF reflecting objects can be localized and tracked.

One general advantage of this innovation is the friendliness to other users of the spectrum. As the frequency hopping doesn't have to be continuous, and can happen in a random fashion, other users can use the spectrum at the same time, without being impacted by the ranging procedure. The frequency hopping has also the advantage that specific frequencies of significant interference can be blocked out and hopped around.

Embodiments relate to ranging systems, including integrated ranging systems, which are capable of providing precise measurements with minimal bandwidth utilization. Embodiments provide an active-reflector, or transponder-type radio frequency ranging system in which phase and frequency coherency between master and slave devices can be precisely established during periods when measurement data is generated.

Embodiments enable discontinuous transmissions on multiple frequencies in order to optimize the use of available bandwidth, and to avoid channels which are either being used for unrelated transmissions or beset with noise.

Embodiments may provide a system of vernier measurement, whereby distances are measures in terms of an integer number of wavelengths plus a fraction of a wavelength that is determined by phase angle differences between two transmissions at different frequencies. Embodiments eliminate multi-path data from ranging calculations in some examples.

A high-resolution active reflector radio frequency ranging system includes at least two radio frequency transceivers (e.g., devices or nodes) in one example. One of the transceivers, acting as a master device, transmits a radio frequency signal burst to at least one other designated transceiver which acts as a slave device and active reflector. The slave device, actively matches the phase and frequency of the incoming signal and retransmits a signal at the matched phase and frequency. The slave can retain the phase and frequency data that it receives for some time before retransmitting the signal to the master. Within a network, master and slave designations are arbitrary, as those roles can be temporarily assigned as required. In fact, any device that initiates a ranging operation may be a master device. Each transceiver device, or node, may be assigned a unique address. As the system supports a master with multiple slaves, point-to-point ranging, as well as point-to-multipoint ranging are enabled.

Operation of the high-resolution active reflector radio frequency ranging system will now be described. A first device (the acting master) transmits a radio signal burst asking for a ranging measurement. A second device (the acting slave) determines, either by default or by decoding a read range data packet, that it is the device from which the acting master is requesting the ranging measurement. Following a positive determination, the acting slave device measures phase and/or frequency drift of the incoming carrier wave and aligns its own oscillator, or clock, so as to achieve commonality of frequency and phase coherence with the incoming signal. Accuracy of oscillator alignment within the slave unit can be enhanced by transmitting multiple packets. The slave extracts phase and frequency data from each packet or determines the phase and frequency data using a phase information unit and averages the results in one example. The more packets that are received over time, the more accurate the calculation of the phase and frequency of the incoming carrier and the readjusting of the slave's internal clock or oscillator.

For an embodiment of the invention, an adaptive loop is employed to measure the phase of random incoming packets from the master and adjust the slave unit's oscillator so that it is phase coherent with the master unit's oscillator. No continuous wave transmission is required. In fact, the incoming RF signal can transmit multiple packets over multiple frequencies during different periods of time. The preferred embodiment of the invention may also incorporate a delta sigma phase lock loop, which maintains phase coherency of the of the slave unit's oscillator with the incoming signal, regardless of its frequency. Software onboard the slave unit is used to process incoming signal information and reconstruct it in order to maintain phase lock of the slave unit's oscillator with that of the master. This feature facilitates the implementation of frequency hopping, which is used in determining measurement of absolute distances between master and slave units.

One embodiment employs thermally-insulated reference oscillators, which need be neither highly stable over time, nor highly accurate at a rated temperature. However, the thermally-insulated oscillators are very stable over short periods of time commensurate with the periods required either by the master unit to send a burst signal and receive a burst signal in response, or for a slave unit to receive, analyze, and retransmit a signal burst. A thermally-insulated quartz crystal oscillator can be fabricated by encapsulating the oscillator within an Aerogel® insulation layer. Aerogel is an ideal insulator for the application, as it has a coefficient of expansion that is virtually identical to that of quartz. Thus, in the case of a slave unit, its thermally-insulated reference oscillator is adjusted in frequency and phase to match those corresponding characteristics of the carrier wave received from the master unit, and the signal is retransmitted to the master. This process occurs over such a short period of time that any frequency drift in the thermally-insulated reference oscillator is negligible. A thermally-insulated reference oscillator (TIRO) has an advantage over an ovenized oscillator in terms of both cost and energy consumption. For battery powered devices, ovenized oscillators are highly impractical, as they must remain heated even when not in actual use in order to maintain stability. A 16 MHz thermally-insulated reference oscillator developed for the prototype high-resolution active reflector radio frequency ranging system has exhibited drift characteristics of less than 2.5 parts per 10 billion over a period of one second. Using this type of reference oscillator, the system is capable of ranging accuracies of better than 0.125 mm.

When the master unit transmits a radio frequency burst at a particular frequency to a slave unit, the signal is received by the slave unit, mixed with at least one local oscillator signal to create an error signal, which is fed to a digital control system consisting of a central processing unit or state machine. The output from the digital control system is fed to the reference oscillator, which controls the delta sigma phase lock loop, which in turn, controls the local oscillator. Because the individual bursts may be too short to generate an accurate determination of phase and frequency error, several bursts may be required to achieve optimum lock-on of the slave unit's reference oscillator. Thus, the TIRO retains the incoming phase and frequency information so that no matter on which channel the phase lock loop (PLL) is initially set, it derives its phase information from the reference oscillator. Thus, as the TIRO sets the phase and frequency of the PLL, the TIRO also effectively sets the frequency of the slave unit's transmitter and local oscillator.

There are two major problems associated with divide-by-integer phase lock loops. The first is that if sufficient bandwidth is allocated to the low-pass filter for a required modulation range, there is insufficient step resolution for both frequency generation and frequency modulation. The second is that if smaller frequency steps are utilized, there is insufficient band width at the low-pass filter. Fractional phase lock loops (also known as delta sigma phase lock loops) were developed to solve precisely these problems. For example, in one embodiment of the invention, the fractional PLL generates 64 clock cycle phase relations (diffs) of the local oscillator for each cycle of the 16 Mhz reference oscillator. However, when a fractional PLL is used, the wave form edges of the generated signal may not directly align with the reference oscillator. This is especially problematic in a ranging system where synchronicity of phase relationship between transmitted and received signals is essential for meaningful distance measurements. In addition, if burst-mode operation or frequency-hopping is envisioned, or if the local oscillator—for the sake of circuit simplicity and minimal power consumption—is shared between transmit and receive functions, it is essential that the phase relationship between the transmitted and the received signal be establishable at all times. Embodiments may employ a phase relationship counter, which keeps track of the fractional time frames of the fractional phase lock loop as a function of the reference oscillator. The phase relationship counter provides absolute phase information for an incoming burst on any channel within the broadcast/receive band, thereby enabling the system to almost instantaneously establish or reestablish the phase relationship of the local oscillator so that it synchronized with the reference oscillator. The phase relationship counter, coupled with the thermally-insulated reference oscillator that ensures synchronicity of master and slave reference oscillators with negligible drift over short periods of time, allows the system to: minimize power consumption by cutting power to all but the reference oscillator and phase-relationship counter when it is not receiving or transmitting signals; utilize a common voltage-controlled local oscillator for both receive and transmit operations; and maintain predictable phase relationships between the local oscillator and the received signal for both discontinuous bursts at the same frequency and bursts at different frequencies (frequency hopping). Frequency hopping greatly enhances the usefulness of the system, as noisy channels can be avoided and the presence of multipath transmissions can be detected and eliminated from ranging calculations. Frequency hopping can be used with any radio technology where adequate bandwidth is provided.

The radio transceivers used to implement embodiments may employ quadrature phase modulation (QPM). Like all modulation schemes, QPM conveys data by changing some aspect of a carrier signal, or the carrier wave, (usually a sinusoid) in response to a data signal. In the case of QPM, the phase of the carrier is modulated to represent the data signal. Although the invention can be implemented by calculating the phase shift of incoming data packets, it can also be implemented by demodulating the phase shift of the QPM data packets and using the resulting data to calculate range.

Vernier measurement techniques can be employed to enhance the accuracy of distance calculations for the present invention. Although vernier measurement has been used in FM radar systems, those systems typically relied on the simultaneous transmission to two or three signals at different frequencies. Embodiments, on the other hand, are unique in that vernier measurement can be implemented using randomly-selected frequencies within randomly-selected channels, which are transmitted during randomly-selected time intervals. This is because the phase relationship counter associated with the slave unit's fractional phase lock loop allows the phase relationship of any received signal to be established as a function of the slave reference oscillator which, for relatively short periods of time, can be considered synchronous with the master reference oscillator. Vernier measurements are made in the following manner: At least two signals, which are in phase at the point of transmission, are transmitted on different frequencies. A course measurement of distance can be made by measuring the phase difference between the signals. Two frequencies suffice if they will not share a common null point over the measured distance. For two-signal measurement, the bandwidth required depends on how accurately phase difference between the two signals can be measured. If measurement accuracy is 3 degrees, then bandwidth can be 0.833 percent of a 400 MHz band, which is a 3.33 MHz-wide band, or two channels that are 3.33 MHz apart. If measurement accuracy is 1 degree, then bandwidth can be 0.277 percent, or 1.11 MHz of the same band. Vernier ranging can be easily implemented on the band specified for wireless personal area network (WPAN) in North America under IEEE specification 802.15.4-2006, as it provides for thirty channels within a bandwidth of 902-928 MHz. If resolution of the receiver is less than 1 wavelength, phase of a received signal can be measured. A coarse measurement provides the number of wavelengths from the transmitter. By calculating absolute phase of the received signals, a fraction of a wavelength can then be added to the number of wavelengths from the transmitter for a more accurate calculation of range. In accordance with the present invention, it is possible to build a radio which can resolve the phase of received signals down to as little as 0.1 degree. With such a radio, phase differences between two adjacent frequencies within a narrow band can be easily resolved. In a band having a wavelength of 12 cm, theoretical resolution for ranging measurements can be better than 0.005 cm.

As previously stated, two frequencies can be used for ranging calculations up to a distance where the first null point occurs (i.e., both frequencies once again are momentarily in phase with one another. Two radio signals at different frequencies will, at some distance from the source, eventually null each other out, thereby making measurements beyond that point ambiguous. Thus, at least three frequencies are required to avoid ambiguous measurements. It is particularly helpful if the third frequency and one of the other two frequencies do not possess a divide by n relationship. Because the ranging system of the present invention utilizes a fractional phase lock loop with a phase relationship counter, random frequency hopping can be employed. When operating in the 902-928 MHz band, for example, the present invention can randomly employ any three or more of the 30 channels over time.

A major advantage of the present invention is that it addresses ranging inaccuracies caused by multipath transmissions. Although a multi-frequency ranging system works well if transmissions are made through a conductor or with a laser, a radio transmission through space generally results in reflections of the transmitted wave front, resulting in multipath transmission paths. As any path other than a straight line between the transmission and reception points is necessarily of greater distance, the signal which provides the correct phase shift for accurate ranging will be accompanied by signals that have traveled greater distances and which, therefore, display increased amounts of phase shift.

The ranging systems constructed in accordance with the present invention transmit at least three radio signals at different frequencies and compare the distance-phase relationship between the different frequencies. The ranging system of the present invention utilizes a frequency-hopping approach to identify multipaths, select the shortest path, and calculate the distance of the shortest path. This is uniquely accomplished by constructing a table of measured phase and amplitude vs. frequency for at least three frequencies, which can be randomly selected in order both to avoid noisy channels and utilize only a small portion of available bandwidth at a given time. An analog-to-digital converter inputs phase-amplitude data into the table in frequency order. This data is subjected to a Fourier transform, preferably using a computer system to perform the calculations. The resulting beat-frequency peaks correspond to the various detected paths. The path having the lowest beat frequency is the shortest and actual distance between the system master and slave units. Using digital signal processing, if an inverse fourier transform is performed on the fourier transform data, the inverse fourier transform data can be used to calculate changes in the phase relationships for different frequencies, and correct for distortion caused by multiple reflective paths as the master and slave units move with respect to one another.

Vernier distance measurement and multi-path detection and correction work in concert. The process is performed using the following sequence of steps. Firstly, using frequency hopping involving at least frequencies f1, f2 and f3, phase differences between the various frequency pairs (i.e., between f1 and f2, f1 and f3, and f2 and f3) are determined. Secondly, multipath correction is performed to eliminate multipath data and determine the integer number of wavelengths at one of those frequencies that separate the master and slave unit antennas for the shortest path. Thirdly, the system switches to a phase accumulation mode and calculates the absolute phase of each received frequency, thereby providing data for calculation of a partial wavelength that must be added to the integer number of wavelengths distance for an accurate measurement. Thus, the ranging system for the present invention provides high resolution range measurements with low bandwidth utilization. Although the transmission of multiple frequencies is required for the initial distance calculation, as long as the object doesn't move more than one-half wavelength between measurement calculations, it can be tracked with a single frequency. In a gaming system, for example, the use of a single frequency between antenna pairs once position acquisition is achieved will greatly reduce computational overhead.

The uniqueness of the present invention is grounded in synchronization of the reference oscillators of the master and slave units, regardless of frequency, and in the use of thermally-insulated reference oscillators and phase-lock loops to establish and maintain phase coherency between master and slave units across all frequencies. In addition, the use of frequency hopping enables not only the random selection of low-noise channels, but also multipath data elimination, thereby provide high-resolution measurements with minimal bandwidth requirements.

It will be understood by those having skill in the art that many changes may be made to the details of the above-described embodiments without departing from the underlying principles of the invention. The scope of the present invention should, therefore, be determined by the following claims.

In an illustrative embodiment, any of the operations, processes, etc. described herein can be implemented as computer-readable instructions stored on a computer-readable medium. E radio may include a processor and/or memory in order to process the signal and perform measurements as discussed herein. The computer-readable instructions can be executed by a processor of a mobile unit, a network element, and/or any other computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method to find a location where an object crosses a path between two devices, the method comprising:
performing high-resolution ranging between the two devices, wherein each device includes one or more antennas, wherein the one or more antennas are connected to a transmitter or receiver of the corresponding device by a RF switch or a switch array, wherein the two devices are separate devices that both transmit and receive RF signals; and
determining the location of the object between the two devices by correlating a change in distance of at least one RF path between the two devices.

2. The method of claim 1, further comprising performing high-resolution ranging between multiple devices in an area, wherein the location of the object is determined using individual pair-combinations of the multiple device and their object location estimation on the direct path to determine an absolute object location in the area.

3. The method of claim 1, further comprising:
mapping a multi-path between a transmitter and receiver to detect change of the multi-path area and determine a presence, absence or motion of an object in the area, the method comprising:
performing high-resolution ranging using multiple devices that are arranged in the area;
mapping multiple paths in the area; and
determining whether the presence, absence, or motion of an object in the area based on changes to electromagnetic waves of the multiple paths.

4. The method of claim 3, further comprising detecting the object based on differences in the mapping to determine if a change has occurred to detect if the object has moved, entered or left the area.

5. The method of claim 4, wherein changes are detected when changes are detected in phases, signal strengths, and/or distances of the multiple paths in the area.

* * * * *